United States Patent [19]
O'Sullivan

[11] 3,861,965
[45] Jan. 21, 1975

[54] LEAD-ACID BATTERY WITH RESEALABLE VENT VALVE

[75] Inventor: Thomas Denis O'Sullivan, Madison, N.J.

[73] Assignee: Bell Telephone Laboratories, Incorporated, Murray Hill, N.J.

[22] Filed: Sept. 7, 1972

[21] Appl. No.: 287,004

[52] U.S. Cl. .............................. 136/178, 137/469
[51] Int. Cl. .......................................... H01m 1/06
[58] Field of Search ............ 136/178; 137/469, 511, 137/513.3, 513.7, 514.7, 528, 533; 220/44 R

[56] References Cited
UNITED STATES PATENTS

| | | | |
|---|---|---|---|
| 3,199,532 | 8/1965 | Trick | 137/469 |
| 3,257,237 | 6/1966 | Jache | 136/178 |
| 3,459,218 | 8/1969 | Cranage | 137/533 |

Primary Examiner—Donald L. Walton
Attorney, Agent, or Firm—E. B. Cave

[57] ABSTRACT

A lead-acid battery used primarily in float service is described, in which a resealable vent valve is employed. The vent valve relieves excessive build-up of pressure while substantially reducing evaporative water loss. Consequently, topping up need only be performed at relatively long intervals.

5 Claims, 2 Drawing Figures

LEAD-ACID BATTERY WITH RESEALABLE VENT VALVE

BACKGROUND OF THE INVENTION

1. Field of the Invention

This invention relates to lead-acid batteries used primarily for float service and, more particulary, it relates to a resealable vent for relieving pressures generated during operation of such batteries.

2. Description of the Prior Art

There are several varieties of vents described for use in various secondary or storage batteries. Such vents are generally designed to relieve pressures that may occasionally build up due to gas evolution during charging of a battery.

It has long been a goal to achieve a sealed lead-acid battery; see, e.g., 21st Power Sources Conference-1967, pages 60–70. However, due to the accumulation and consequent undesirable build-up of hydrogen gas ($H_2$) pressure during charging, this goal has not been generally achieved. While resealable vent valves have been disclosed, many of these valves are often found to be operating much of the time in an open state to relieve $H_2$ gas pressure and thus enable loss of water by evaporation to occur. Batteries utilizing such vent valves still require "topping up" at fairly frequent intervals.

SUMMARY OF THE INVENTION

In accordance with the invention, a resealable lead-acid battery designed for use on float service is described. By employing a properly designed vent valve, gas pressure is relieved, and water loss by evaporation is reduced. The design of the vent valve necessarily calls for a sealable movable member, which exposes a relatively small surface area to gases generated within the battery cell while in a closed or sealed condition and a relatively large surface area while in an open condition, during which time the gases are vented. The vent valve design prevents substantial accumulations of hydrogen gas pressure, and topping up of the battery need only be carried out at infrequent intervals.

DETAILED DESCRIPTION OF THE INVENTION

1. Operation of a Float Service Battery

A float service battery is constantly on a trickle charge at a voltage slightly higher than the open circuit voltage, in order to maintain a full charge; see Vol. 49, Bell System Technical Journal, pp. 1,321–1,334 (1970). For example, a fully charged battery having an open circuit potential of 2.06 volts per cell, is commonly floated at 2.17 volts per cell in telephone exchanges. During such charge maintenence, there is some electrolysis action in which oxygen is evolved at the anode and hydrogen is evolved at the cathode. The oxygen evolved at the anode diffuses into the electrolyte and recombines with hydrogen at the cathode to form water. This recombination process consumes a substantial proportion of the current in the cell, with the remainder of the current available to produce free hydrogen ($H_2$). Typically, about 80 percent of the total current in the cell is used up in the recombination process, leaving about 20 percent of the current to produce $H_2$; see the Bell System Technical Journal reference cited above at p. 1,343. The amount of $H_2$ so produced will accumulate over a period of time, and it is necessary to vent this gas.

While there is in fact no difference between a battery in a telephone exchange operated on float service and an automobile battery recharging during operation of the car, it is likely that the vent valve described herein will find more use in the former application, where low maintenance and battery longevity are of primary concern.

2. The Figures

Figure 1:
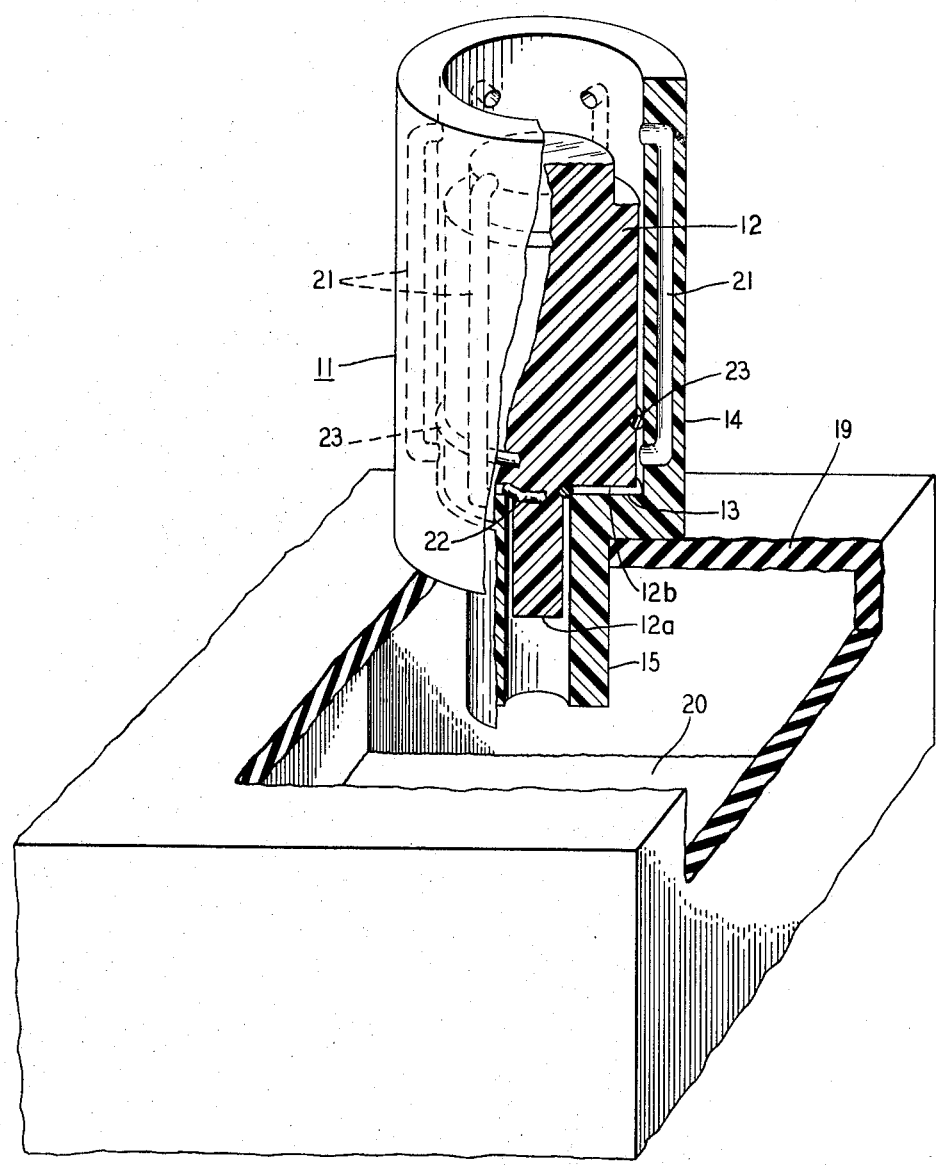
FIG. 1 shows a partially sectioned perspective view of a preferred embodiment of a vent valve, in a normal closed position, mounted on a cell casing of a battery.
Figure 2:
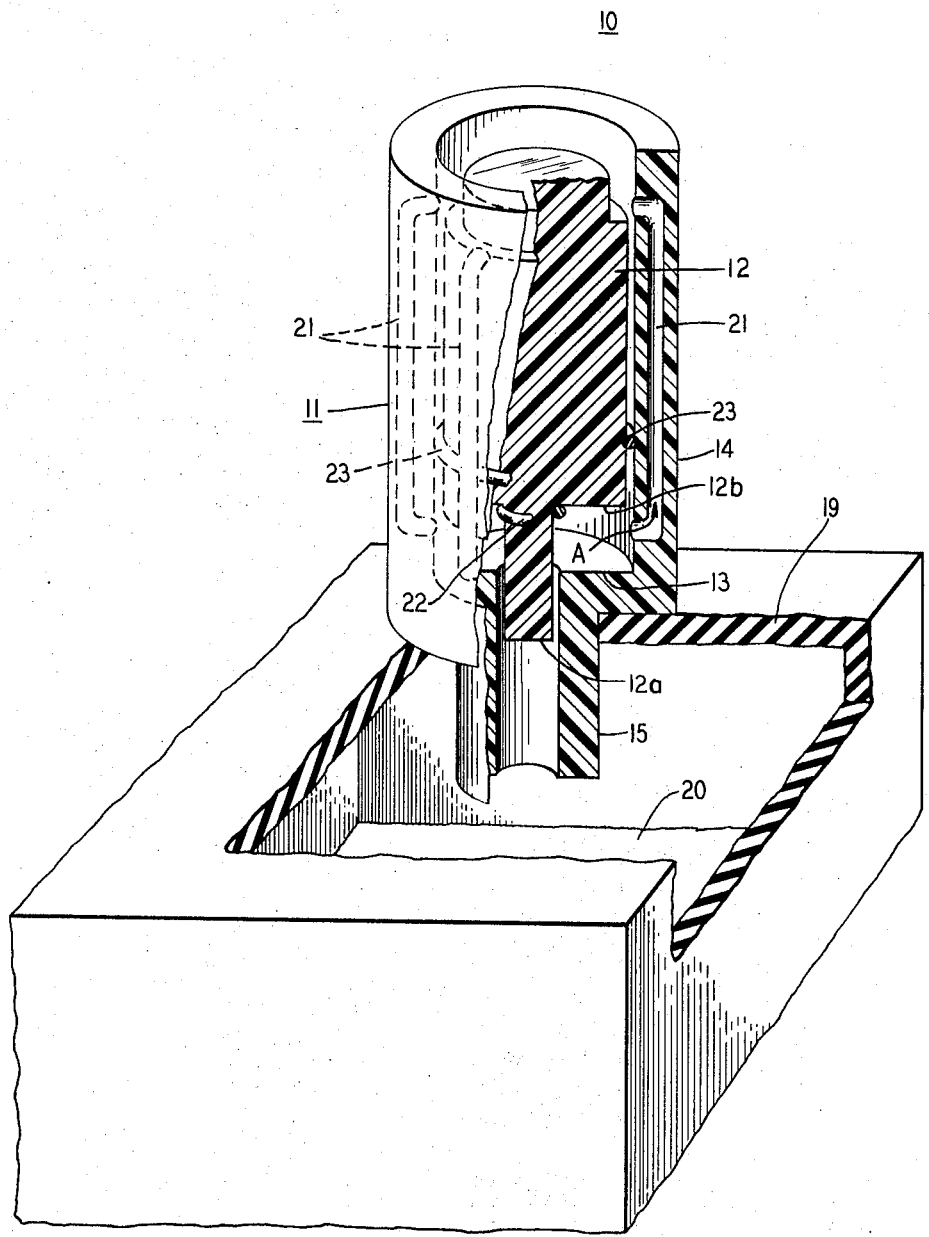
FIG. 2 shows a similar view of the vent valve during relief of excess gas pressure.

In FIGS. 1 and 2, a vent valve 10 comprises a sleeve (or tubular member) 11 and a movable member (or slug) 12 capable of moving in response to pressure generated by formation of gases. The vent valve is mounted so that part of the sleeve 11 extends through a cell casing (or receptacle) 19 and terminates in the free space above electrolyte 20. The drawing shows only the details of the vent construction. The vent is designed to be used in conjunction with a typical lead-acid storage battery having at least two rechargeable spaced electrodes of opposite polarity per cell in contact with the electrolyte and having at least one cell, with all connections made internally, etc. The cell casing, together with the vent valve in its normal closed position, forms a liquid-tight and air-tight enclosure.

Means 13 for supporting the moveable member 12 in the sealed position (FIG. 1) are provided by the particular design of the sleeve 11. The two portions of the sleeve (the portion 14 extending out of the cell casing 19 into the atmosphere and the portion 15 extending into the battery casing) may be manufactured from one piece, as by molding, shaping, and the like, or by joining together two sleeves of dissimilar diameters. Gasket 22 provides a tight seal impervious to hydrogen gas and inert to the sulfuric acid solution ordinarily employed in lead-acid batteries.

While it is possible to allow the escaping gases to vent out along the space between the side of the movable member and the wall of the sleeve, this is undesirable, due to a tendency of the escaping gases to lift the movable member out of the sleeve. Accordingly, vent means, such as ports or channels, are provided to enable the gases to escape. As shown on FIG. 1, such means might consist of at least one passageway 21 within the wall of sleeve 11, beginning on the interior surface of the sleeve portion 14 near the end connectable to the cell casing and terminating at the opposite end. In this example, the length of the passageway is longer than the length of the surface of the movable member 12 adjacent to the interior surface of the sleeve. The passageway terminates on the interior surface of the sleeve. This arrangement allows a diffusion cap (not shown) to be placed over the top of the sleeve, if desired. The diffusion cap, ordinarily made of a porous material, harmlessly disperses hydrogen gas into the atmosphere. Alternative designs, such as vertical grooves along the inside wall of sleeve 11, will accomplish the same purpose. Gasket 23, which may be optional, is used to force the escaping gas to exit through the venting means.

The material comprising the sleeve and the movable member must, of course, be inert to the acid comprising the electrolyte of the lead-acid battery. Such materials may include polytetrafluoroethylene, polyvinylchloride, etc. The materials comprising the gaskets must be both inert to sulfuric acid and impervious to hydrogen. An example of such a material is butyl rubber.

3. Operation of the Vent Valve

It is desired that the movable member 12 relieve excess $H_2$ pressure without chattering and with only minimal water losses. The movable member is constructed so as to consist of two different diameters, 12a (the lower extremity of the movable member) and 12b (the shoulder on the movable member that mates with the sleeve to maintain a sealed condition). When the internal pressure is approximately equal to the external pressure, gasket 22 prevents escape of small amounts of $H_2$ and water vapor. As the $H_2$ pressure increases during float operation, only the surface area $a_1$ of portion 12a is available for gas to exert pressure thereon. At some pressure $P_1$, the movable member 12 will be lifted up by a force $F_1$ equal to $P_1 \times a_1$, thereby permitting the excess amount of $H_2$ gas above the external pressure to escape, as shown by arrow A in FIG. 2. Gasket 23 forces the escaping gas to exit by means of passageway 21. In the open position, the pressure of the gases in the battery casing now exerts a force $F_2$ on the combined surface areas, $a_1 + a_2$, of portions 12a and 12b. But since the force exerted on the smaller area was sufficient to lift the entire movable member, the movable member will return to its closed position (thereby resealing the battery) only when the gas pressure has dropped to a lower pressure $P_2$. Specifically, the pressure must drop to a value equal to $F_1/(a_1 + a_2)$.

Chattering is minimized by choosing the ratio of $a_1$ to the total area $a_1 + a_2$ to be sufficiently large such that a substantial amount of pressure is relieved before resealing occurs. Water loss is minimized by setting the value of the pressure required to open the valve such that the valve opens only for a very short period of time relative to the amount of time that the valve remains sealed.

In the type of batteries used in telephone exchanges, 2.06 volt cells floated at 2.17 volts generate a pressure differential of about 0.1 atmospheres in about 2 to 3 days, due to $H_2$ formation. This value may vary somewhat, depending on the size of the battery, the volume of the open space above the electrolyte, etc.

As a result of these considerations, and taking into account the physical limitations of vent valve dimensions and the internal pressure capabilities of a battery structure, it is possible to set ranges of operational values that may be selected by the practitioner. The ratio of $a_1:(a_1+a_2)$ may vary from about 1:1.5 to about 1:25. Below a ratio of about 1:1.5, some chattering will occur. The physical limitations of machining a ratio greater than about 1:25 become impractical. A preferred range may be set from a ratio of about 1:5 to a ratio of about 1:15. The pressure at which the valve opens may range from a pressure differential of about 0.01 atmospheres to about 1 atmosphere relative to the external pressure. Below a pressure differential of about 0.01 atmosphere, chattering begins to occur. In order to reduce the possibility of cracking, the cell casing should not be exposed to a pressure differential greater than about 1 atmosphere. A preferred range may be set from about 0.05 atmospheres to 0.5 atmospheres. Selection of values within this range lead to a ratio of time open to time closed of about 1:40,000, which is considered to be acceptable.

As an example, a vent valve incorporating the inventive concept described herein has been fabricated. Using a movable mass of 100 grams and a ratio of $a_1:(a_1 + a_2)$ of 1:10, the valve opens at a pressure differential of 0.1 atmospheres and reseals at a pressure differential of 0.01 atmospheres. This results in pressure relief about every 2 to 3 days. The valve remains open for about 5 seconds each time to reduce the pressure to the precalculated value.

At these times of pressure relief, some water vapor is also lost. However, since the water vapor formed above the surface of the electrolyte is a fraction of the total gas present, very little water is actually lost by evaporation. Extrapolations from measured data have shown that about 50 milliliters of water may be lost by this mechanism over a period of about 15 years, which is about half the life of a battery used in telephone exchanges. Simultaneously, grid corrosion by the electrolyte leads to a loss of about 1 liter of water in the same time period. It is expected that water additions to such batteries employing the vent valve described herein need only be made, if at all, in the 15th year of the battery.

What is claimed is:

1. Apparatus comprising at least one lead acid storage cell, each cell comprising:
   a. a receptacle,
   b. a pair of spaced electrodes so arranged as to be partially immersed when an electrolyte is introduced into the receptacle,
   c. the receptacle being provided with an orifice containing a valve, which is normally closed but is designed to open upon attainment of a first differential positive pressure within the cell relative to external pressure and is designed to close at a second differential pressure, with the first pressure being greater than the second pressure, characterized in that the valve comprises:
   (a) a tubular member comprising:
      1 a first hollow sleeve portion having an inner vertical surface of substantially constant diameter,
      2 a second hollow sleeve portion, one end of which is joined to the lower end of the first sleeve portion, the second sleeve portion (a) having an inner vertical surface of smaller diameter than the first sleeve portion to thereby form a shoulder at the juncture of the first and second sleeve portions and (b) extending through the orifice into the cell, and
      3 at least one channel extending from interior the juncture region of the lower end of the first sleeve portion to exterior the valve for providing release of pressure from the cell when the valve is open; and
   (b) a slug capable of moving in response to pressure generated in the cell by formation of gases, the slug comprising:
      1 a first cylindrical portion of approximately the same constant diameter as the first sleeve portion and slidably mounted in the first sleeve portion,
      2 a second cylindrical portion, (a) a first end of which is joined to the lower end of the first cylindrical portion, the second cylindrical portion having a smaller diameter than the first cylindrical portion so as to define an annular shoulder at the juncture of the first and second cylindrical portions, which annular shoulder mates with the shoulder of the tubular member so as to seal the cell when the valve is closed, and (b) a second end of which terminates within the second sleeve portion, such that when the valve is closed, the pressure in the cell acts only on the second end of the second cylindrical portion extending into the second sleeve portion and such that when the valve is open, the pressure in the cell acts on the combined cross-sectional areas of the second end of the second cylindrical portion extending into the second sleeve portion and of the annular shoulder.

2. The apparatus of claim 1 in which the receptacle is at least partially filled with electrolyte in contact with the electrodes.

3. The apparatus of claim 1 in which the ratio of the cross-sectional area of the second end of the second cylindrical portion to the combined cross-sectional areas of the second end of the second cylindrical portion and of the annular shoulder ranges from about 1:1.5 to about 1:25 and in which the slug is designed so as to move in response to a positive pressure differential ranging from about 0.01 atmospheres to about 1 atmosphere.

4. The apparatus of claim 1 in which the ratio varies from about 1:5 to 1:15 and in which the slug moves in response to a pressure differential ranging from about 0.05 atmospheres to about 0.5 atmospheres.

5. The apparatus of claim 1 in which the tubular member includes at least one channel within its wall.

* * * * *